United States Patent
Hyeon

(10) Patent No.: US 11,764,376 B2
(45) Date of Patent: Sep. 19, 2023

(54) INCORPORATED AIR SUPPLYING APPARATUS FOR FUEL CELL STACK AND METHOD FOR CONTROLLING AIR FLOW FOR FUEL CELL STACK USING SAME

(71) Applicants: HYUNDAI MOTOR COMPANY, Seoul (KR); KIA CORPORATION, Seoul (KR)

(72) Inventor: Min Su Hyeon, Suwon-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 17/692,800

(22) Filed: Mar. 11, 2022

(65) Prior Publication Data
US 2023/0011354 A1 Jan. 12, 2023

(30) Foreign Application Priority Data
Jul. 8, 2021 (KR) .......................... 10-2021-0089966

(51) Int. Cl.
| | |
|---|---|
| H01M 8/04746 | (2016.01) |
| H01M 8/04992 | (2016.01) |
| H01M 8/04082 | (2016.01) |
| H01M 8/0438 | (2016.01) |

(52) U.S. Cl.
CPC ... *H01M 8/04753* (2013.01); *H01M 8/04201* (2013.01); *H01M 8/04395* (2013.01); *H01M 8/04992* (2013.01)

(58) Field of Classification Search
CPC ......... H01M 8/04753; H01M 8/04201; H01M 8/04395; H01M 8/04992
See application file for complete search history.

(56) References Cited

U.S. PATENT DOCUMENTS

2004/0038095 A1* 2/2004 Kushibiki ......... H01M 8/04955
429/423

FOREIGN PATENT DOCUMENTS

KR 10-1358335 B1 2/2014

* cited by examiner

*Primary Examiner* — Olatunji A Godo
(74) *Attorney, Agent, or Firm* — MCDONNELL BOEHNEN HULBERT & BERGHOFF LLP

(57) ABSTRACT

An incorporated air supplying apparatus for a fuel cell stack and a method for controlling an air flow using the same are described. The apparatus includes an air supply part supplying air to a plurality of fuel cell stacks, a plurality of pipes configured to transmit the air supplied from the air supply part to each of the fuel cell stacks, a flowmeter and a valve installed at each pipe, and a controller controlling an opening degree of each of the valves, based on information on the measured flow. The controller controls the opening degree of the valve installed at each pipe, thus enabling the air flow for each pipe to be controlled.

12 Claims, 9 Drawing Sheets

_US 11,764,376 B2_

INCORPORATED AIR SUPPLYING APPARATUS FOR FUEL CELL STACK AND METHOD FOR CONTROLLING AIR FLOW FOR FUEL CELL STACK USING SAME

CROSS REFERENCE TO RELATED APPLICATIONS

The present application claims priority to Korean Patent Application No. 10-2021-0089966, filed Jul. 8, 2021, the entire contents of which are incorporated herein for all purposes by this reference.

BACKGROUND

Field

The present disclosure relates to an apparatus and method for supplying air to a fuel cell system. More particularly, the disclosure relates to an apparatus for supplying air to a plurality of fuel cell stacks, such as a fuel cell for generating power, and a method for controlling air supply using the same.

Description of the Related Art

A fuel cell is an energy conversion device that converts chemical energy of fuel into electric energy by electrochemically reacting the fuel without changing the chemical energy into heat by combustion. The fuel cell may be used not only to supply power for industry, home, or vehicle use, but also to supply power for small electric/electronic products and portable devices.

For example, a membrane-electrode assembly (MEA), which is a main component, is located at an innermost position of a polymer electrolyte membrane fuel cell (PEMFC) having high power density. The MEA is composed of a solid polymer electrolyte membrane that may move hydrogen ions, and a cathode and an anode that are electrode layers to which a catalyst is applied so that hydrogen and oxygen may react on both sides of the electrolyte membrane.

The fuel cell includes a fuel cell stack that generates electric energy through an electrochemical reaction, a hydrogen supply system that supplies hydrogen to the fuel cell stack, an air supply system that supplies air containing oxygen to the fuel cell stack, and a cooling system that controls the operating temperature of the fuel cell stack.

The fuel cell may supply power for industry or home use in a building or the like, or may be mounted on a vehicle to supply power for driving. Particularly, in order to manufacture a power-generating fuel cell that is installed in a building or the like and includes a plurality of fuel cell stacks to generate a large capacity power, it is required to manufacture a large-sized fuel cell stack. However, since the manufacture of the large-sized stack makes it difficult to stack cells and uniformly distribute reactants, a method of connecting several fuel cell stacks is generally used.

On the other hand, in the case of making a large-capacity power generating fuel cell system using the plurality of fuel cell stacks, piping paths extending from an air supplying apparatus to individual stacks are different for every stack, so it is still difficult to uniformly distribute the air.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and an objective of the present disclosure is to provide an incorporated air supplying apparatus for a fuel cell stack and a method for controlling air flow using the same, capable of controlling the amount of air supplied to each fuel cell stack to a desired level without applying an incorporated air manifold, when using a plurality of stacks to make a large-sized stack.

Particularly, the present disclosure allows the air flow of an individual fuel cell stack to be controlled, thus improving the operation and maintenance efficiency of the fuel cell stack.

In order to achieve the objective of the present disclosure, the present disclosure provides an incorporated air supplying apparatus for a fuel cell stack, including an air supply part supplying air to a plurality of fuel cell stacks, a plurality of pipes configured to transmit the air supplied from the air supply part to each of the fuel cell stacks, a plurality of valves installed at the pipes, respectively, to control a flow of air flowing through each of the pipes, a plurality of flowmeters measuring the flow of the air flowing through the pipes, respectively, and a controller controlling an opening degree of each of the valves, based on information on the flow measured by each of the flowmeters, wherein the controller controls the opening degree of the valve installed at each of the pipes, thus enabling the air flow for each of the pipes to be controlled.

The controller may be configured to enable initial setting control for the opening degree of each of the valves. In a state where all the valves are opened and the air supply part is operated at a preset correction rpm, during the initial setting control, the opening degree of each of the valves may be controlled by the controller and then information on the opening degree of the valve may be extracted when a flow deviation of each of the pipes is within a preset reference value, and the controller may store the extracted information on the opening degree of the valve as an initial setting.

The controller may repeat one or more times a process of adjusting the opening degree of the valve on the pipe through which a maximum flow passes, in the closing direction, based on flow information measured by each of the flowmeters during the initial setting control, thus controlling the opening degree of the valve on the pipe having the maximum flow such that the flow of the pipe having the maximum flow approaches average flow information that is an average value of values measured by the flowmeters, and then reducing the flow deviation.

The controller may be configured to adjust a supply flow supplied from the air supply part. When uniform air flow control is required for all the fuel cell stacks, an air flow supplied from each of the pipes may be measured by each of the flowmeters, in a state where the flow supplied from the air supply part is adjusted, the controller may adjust the opening degree of the valve on the pipe through which the maximum flow passes, in the closing direction, based on flow information measured by each of the flowmeters, thus controlling to reduce the flow deviation between the flow of the pipe having the maximum flow and average flow information that is an average value of values measured by the flowmeters, and the controller may repeat average flow measurement and flow deviation reduction control until the flow deviation of each of the pipes is within a preset reference value.

The controller may determine whether or not to reach a flow value required by each of the fuel cell stacks, based on the flow information measured by each of the flowmeters. When the flow value required by each of the fuel cell stacks is not reached even if the flow deviation of each of the pipes is within the preset reference value, supply air flow control, average flow measurement, and flow deviation reduction control of the air supply part may be repeatedly performed until reaching the required flow value.

The controller may be configured to adjust a supply flow supplied from the air supply part. When air flow control is required for a specific fuel cell stack, a total flow of air supplied to remaining fuel cell stacks other than the fuel cell stack whose flow is to be adjusted may be measured and stored, the controller may perform the air flow control for the specific fuel cell stack while repeating one or more times a process of measuring a total flow of air supplied to the remaining fuel cell stacks in real time, in a state where the opening degree of the valve of the fuel cell stack whose flow is to be adjusted is controlled to be changed depending on a required air flow, and then adjusting the supply flow supplied from the air supply part until the total flow of the remaining stacks measured in real time reaches a total flow of the remaining stacks, which is previously stored.

The controller may be configured to adjust a supply flow supplied from the air supply part. When air flow control is required for two or more specific fuel cell stacks, a total flow of air supplied to remaining fuel cell stacks other than the two or more fuel cell stacks whose flow is to be adjusted may be measured and stored, the controller may perform the air flow control for the specific fuel cell stacks while repeating one or more times a process of measuring a total flow of air supplied to the remaining fuel cell stacks in real time, in a state where the opening degree of the valve of the fuel cell stack whose flow is to be adjusted is controlled to be changed depending on a required air flow, and then adjusting the supply flow supplied from the air supply part until the total flow of the remaining stacks measured in real time reaches a total flow of the remaining stacks, which is previously stored.

When the sum of flow changes for the fuel cell stacks whose air flow is to be adjusted exceeds the preset reference flow, the controller may separately control the air flow such that the sum of the flow changes for the fuel cell stacks is within the preset reference flow.

Further, the present disclosure provides a method for controlling an air flow using an incorporated air supplying apparatus for a fuel cell stack of the disclosure, the method including an initial setting control process for controlling an opening degree of each of valves by a controller, before an operation of the fuel cell stack. In the initial setting control process, the controller may control the opening degree of each of the valves to extract information on the opening degree of the valve when a flow deviation of each of pipes is within a preset reference value, in a state where all the valves are opened and the air supply part is operated at a preset correction rpm, and the controller may store the extracted information on the opening degree of the valve as an initial setting.

The initial setting control process may include an initiation step at which all the valves are opened and the air supply part is operated at the preset correction rpm, an average flow calculation step of calculating average flow information, based on flow information measured by each of flowmeters, a valve opening-degree control step of adjusting an opening degree of the valve on the pipe through which a maximum flow passes, in a closing direction, a flow-deviation check step of checking whether a maximum flow deviation determined from a difference between a flow value of the maximum flow pipe reduced at the valve opening-degree control step and the average flow information is within a preset reference value, and a step of extracting opening-degree information of each of the valves to store the information as the initial setting, when the maximum flow deviation is within the preset reference value.

At the flow-deviation check step, when the maximum flow deviation is out of the preset reference value, the average flow calculation step, the valve opening-degree control step, and the flow-deviation check step may be repeatedly performed until the maximum flow deviation falls within the preset reference value.

Further, the present disclosure provides a method for controlling an air flow using an incorporated air supplying apparatus for a fuel cell stack of the disclosure, the method including, when uniform air flow control is required for all the fuel cell stacks, during an operation of each of the fuel cell stacks, a supply flow control step of controlling a flow supplied from the air supply part, an average flow calculation step of calculating average flow information by measuring an air flow supplied through each of pipes by each of flowmeters, a valve opening-degree control step of controlling an opening degree of the valve on the pipe through which a maximum flow passes, in a closing direction, a flow-deviation check step of checking whether a maximum flow deviation determined from a difference between a flow value of the maximum flow pipe reduced at the valve opening-degree control step and the average flow information is within a preset reference value, and a required flow arrival check step of checking whether or not to arrive at a flow value required for each fuel cell stack, on the basis of the flow information measured by each of the flowmeters.

When it is determined through the flow-deviation check step that the maximum flow deviation is out of the preset reference value, the average flow calculation step, the valve opening-degree control step, and the flow-deviation check step may be repeatedly performed until the maximum flow deviation falls within the preset reference value. When it is determined through the required flow arrival check step that the flow does not arrive at the flow value required for each fuel cell stack, the air supply flow from the air supply part may be adjusted again depending on the required flow value, and then the average flow calculation step and the following steps may be performed again.

Further, the present disclosure provides a method for controlling an air flow using an incorporated air supplying apparatus for a fuel cell stack of the disclosure, the method including, when air flow control is required for a specific fuel cell stack, during an operation of each of the fuel cell stacks, a total flow detection step of measuring and storing a total flow of air supplied to remaining fuel cell stacks other than the fuel cell stack whose flow is to be adjusted, a valve opening-degree control step of controlling the opening degree of a valve of the fuel cell stack whose flow is to be adjusted, depending on a required air flow, and a supply flow control step of measuring a total flow of air supplied to the remaining fuel stacks in real time, and adjusting a supply flow supplied from the air supply part until the total flow for the remaining stacks measured in real time reaches a total flow for the remaining stacks, which is previously stored.

Furthermore, when air flow control is required for two or more specific fuel cell stacks, during an operation of each of the fuel cell stacks, the method may include a total flow detection step of measuring and storing a total flow of air supplied to remaining fuel cell stacks other than the two or more fuel cell stacks whose flow is to be adjusted, a valve opening-degree control step of controlling the opening degree of a valve of each of the two or more fuel cell stacks whose flow is to be adjusted, depending on a required air flow, and a supply flow control step of measuring a total flow of air supplied to the remaining fuel stacks in real time, and adjusting a supply flow supplied from the air supply part until the total flow for the remaining stacks measured in real time reaches a total flow for the remaining stacks, which is previously stored.

An incorporated air supplying apparatus for a fuel cell stack and a method for controlling air supply according to the present disclosure are advantageous in that it is possible to control the flow of air supplied for each stack by the air supplying apparatus, thus solving an air distribution problem that may occur due to a separate air piping path provided for each stack, and thereby controlling to supply a uniform air amount to each stack.

Further, the present disclosure is advantageous in that a flow may be controlled for an individual air stack, so the individual stack may be replaced with another one even during the operation of a fuel cell system, and a separate air supply logic may be applied for each stack based on status information such as stack durability or a power generation amount.

Furthermore, the present disclosure is advantageous in that it is possible to independently control a flow for each fuel cell stack, so stack durability can be improved, and a desired level of power generation amount can be continuously maintained, and consequently the operation and maintenance efficiency of the fuel cell system is improved.

BRIEF DESCRIPTION OF THE FIGURES

The above and other objectives, features, and other advantages of the present disclosure will be more clearly understood from the following detailed description when taken in conjoint with the accompanying drawings, in which:

FIGS. 7A, 7B, and 7C illustrate examples where air flow is simultaneously controlled in ten fuel cell stacks, in which FIG. 7A illustrates an example where the air flow of several stacks may be simultaneously controlled based on the absolute value of a change in the total flow, FIG. 7B illustrates an example where it is impossible to simultaneously control the air flow of several stacks based on the absolute value of a change in the total flow, and FIG. 7C illustrates an example where the air flow may be separately controlled for each section, when the flow control is required as shown in FIG. 7B.

DETAILED DESCRIPTION

An air supplying apparatus according to the present disclosure may be applied to a large-sized stack for producing relatively large power, such as a fuel cell for generating power. In particular, the air supplying apparatus is suitable for forming several fuel cell stacks in a fuel cell system for the purpose of making such a large-sized stack. Further, the air supplying apparatus according to the present disclosure is configured to integrally control the amount of the air supplied to an individual path connecting several stacks from an air blower or an air compressor, without applying a single air manifold, when supplying the air to each stack. Particularly, the air supplying apparatus according to the present disclosure may reduce a deviation of the amount of air supplied to each fuel cell stack through the individual path, and may control the individual flow for each stack as necessary.

In this connection, the fuel cell stack according to a preferred embodiment of the present disclosure is configured to receive air by an independent path connected to an air supply part 10, and refers to one power generation unit in which power is generated by a fuel cell. For example, such a fuel cell stack may include a plurality of unit cells, and each fuel cell stack may be connected to an air supply path assigned thereto. However, the fuel cell stack of the present disclosure is only used to refer to each power generation unit in which the flow control is performed, and does not restrictively mean only a stack type in which unit cells are stacked. Therefore, if even a single cell is a power generating configuration connected by the individual path, the single cell may be interpreted as being included in the fuel cell stack of the present disclosure.

Further, the number of fuel cell stacks may be appropriately selected according to a required power generation capacity. If necessary, the air supplying apparatus according to the present disclosure may be applied only to a portion of the system. In this case, the fuel cell stack to which air is collectively supplied by an integral manifold may be included.

Hereinafter, an incorporated air supplying apparatus for a fuel cell stack and a method for controlling an air flow using the same according to various embodiments of the present disclosure will be described in detail with reference to the accompanying drawings.

Figure 1:
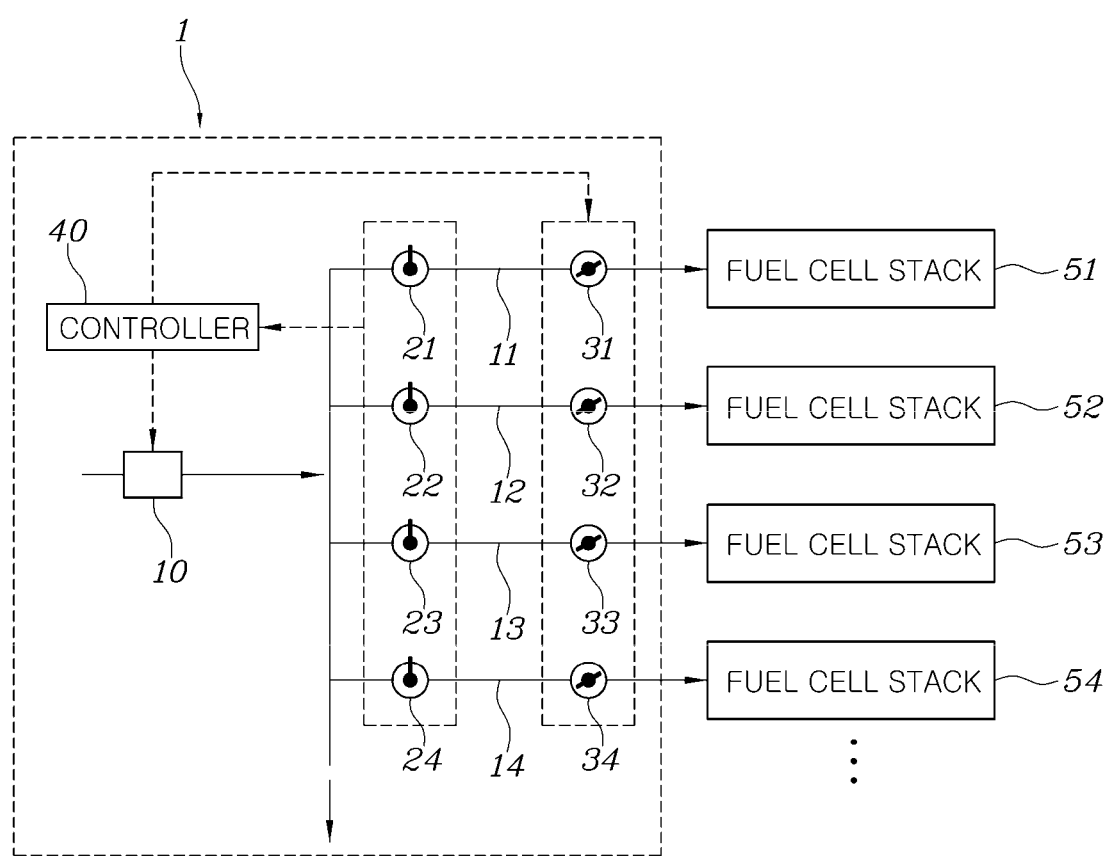
FIG. 1 is a diagram showing the schematic configuration of an incorporated air supplying apparatus of a fuel cell stack according to an embodiment of the present disclosure.

FIG. 1 is a diagram showing the schematic configuration of an incorporated air supplying apparatus of a fuel cell stack according to an embodiment of the present disclosure.

Referring to FIG. 1, an air supplying apparatus 1 of an incorporated fuel cell stack according to a preferred embodiment of the present disclosure includes an air supply part 10 that supplies air to a plurality of fuel cell stacks 51, 52, 53, and 54, and a plurality of pipes 11, 12, 13, and 14 that serve as paths for transmitting air supplied from the air supply part 10 to the fuel cell stacks 51, 52, 53, and 54. A pipe connected to the air supply part 10 may be branched into the fuel cell stacks 51, 52, 53, and 54, and flowmeters 21, 22, 23, and 24 and valves 31, 32, 33, and 34 may be installed on the branched air pipes 11, 12, 13, and 14. The flowmeters 21, 22, 23, and 24 installed at the pipes 11, 12, 13, and 14 are intended to measure the flow of air supplied to the pipes 11, 12, 13, and 14, and the valves 31, 32, 33, and 34 are intended to control the flow of air supplied to the fuel cell stacks 51, 52, 53, and 54 through the valves 31, 32, 33, and 34 by controlling opening degrees thereof. The valves 31, 32, 33, and 34 may be throttle valves.

A controller 40 is included to control the valves 31, 32, 33, and 34 and the air supply part 10 in the air supplying apparatus. Such a controller 40 may be configured to receive flow information detected by the flowmeters 21, 22, 23, and 24, and may be preferably configured to control the flow of supply air based on the detected flow information.

As for the control of the air flow, the controller 40 may control the opening degrees of the valves 31, 32, 33, and 34 installed at the pipes 11, 12, 13, and 14, and it is possible to control the air flow for the pipes 11, 12, 13, and 14 by controlling the opening degrees of the valves 31, 32, 33, and 34. Further, the controller 40 may control the air supply part 10, and the air supply part 10 may be an air blower or an air compressor that is driven by a motor, sucks outside air, and supplies air through the pipes 11, 12, 13, and 14 to the fuel cell stacks 51, 52, 53, and 54. Therefore, the controller 40 may control the air supply flow by controlling the motor rpm of the air supply part 10.

To be more specific, as shown in FIG. 1, the flowmeters 21, 22, 23, and 24 and the valve 31, 32, 33, and 34, which are assigned to respective stacks, may be installed at the pipes 11, 12, 13, and 14 connected to the respective fuel cell stacks 51, 52, 53, and 54. Preferably, the controller 40 may control the rpm of the air supply part 10 and/or the opening degree of the valve based on the flow information measured by each flowmeter 21, 22, 23, or 24, thus controlling the air flow.

As for the control of the air flow, the controller may include a correction function for settling a difference in initial flow due to a pressure loss which may occur because piping paths to respective stacks are different from each other.

To this end, the controller is configured to control the initial setting for the opening degree of each of the valves. In a state where all the valves are opened and the air supply part is operated at a preset correction rpm during the initial setting control, the opening degree of the valve is controlled by the controller, and then information on the opening degree of the valve may be extracted when a flow deviation of each pipe is within a preset reference value. The controller may store the extracted information on the opening degree of the valve as the initial setting.

To be more specific, the controller may extract an initial set value for the opening degree of the valve at which the air flow to each pipe becomes relatively constant, while repeating one or more times the process of adjusting the opening degree of the valve on the pipe through which a maximum flow passes, in the closing direction, based on the flow information measured by each flowmeter during the initial setting control, thus controlling the opening degree of the valve on the pipe having the maximum flow such that the flow of the pipe having the maximum flow approaches average flow information that is the average value of values measured by the flowmeters, and then reducing the flow deviation.

The extracted initial set value for the opening degree of the valve may be stored in a storage device such as a memory in the controller, and the correction function may reduce the flow deviation caused by pressure loss that may occur as each fuel cell stack has a different piping path. Therefore, in case that the correction function is performed before the operation of the fuel cell stack, it is possible to provide the uniform air flow for each stack.

Further, the controller may control to evenly increase or decrease the total air flow for each stack, and may be configured to increase or decrease the air flow for an individual stack or a plurality of stacks.

In this regard, a specific method of controlling the air supply flow by the controller will be described in detail with reference to FIGS. 2 to 6.

Figure 2:
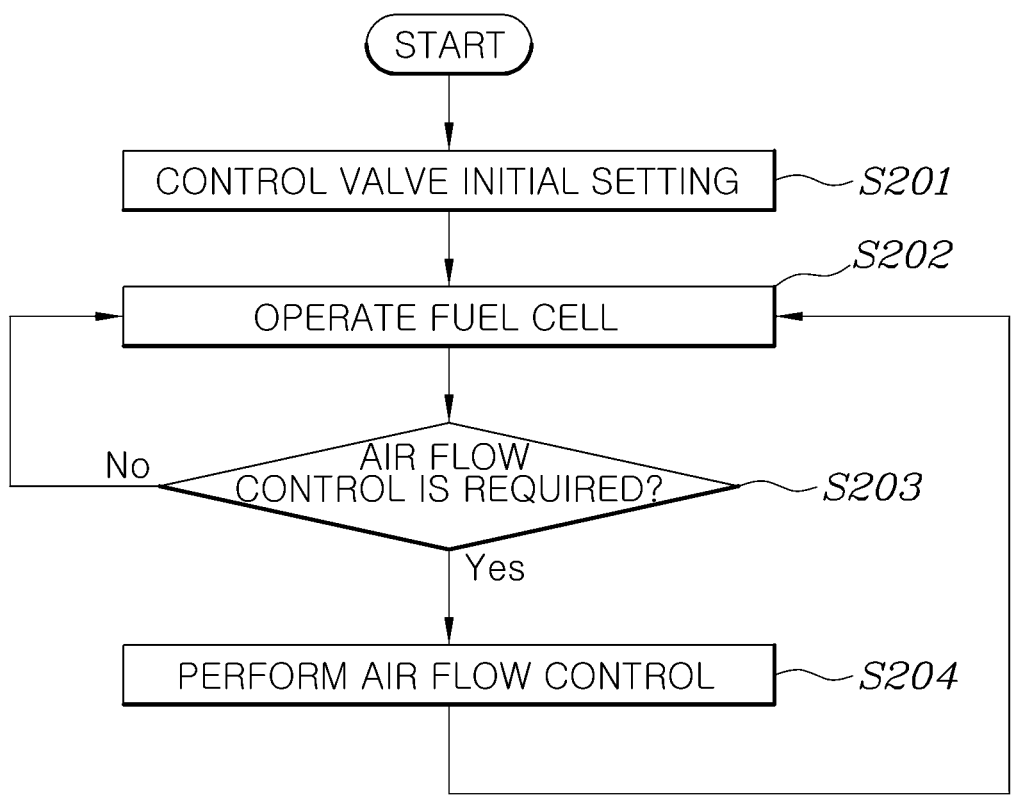
FIG. 2 is a flowchart illustrating a method for controlling an air flow using the incorporated air supplying apparatus of the fuel cell stack according to an embodiment of the present disclosure.
Figure 3:
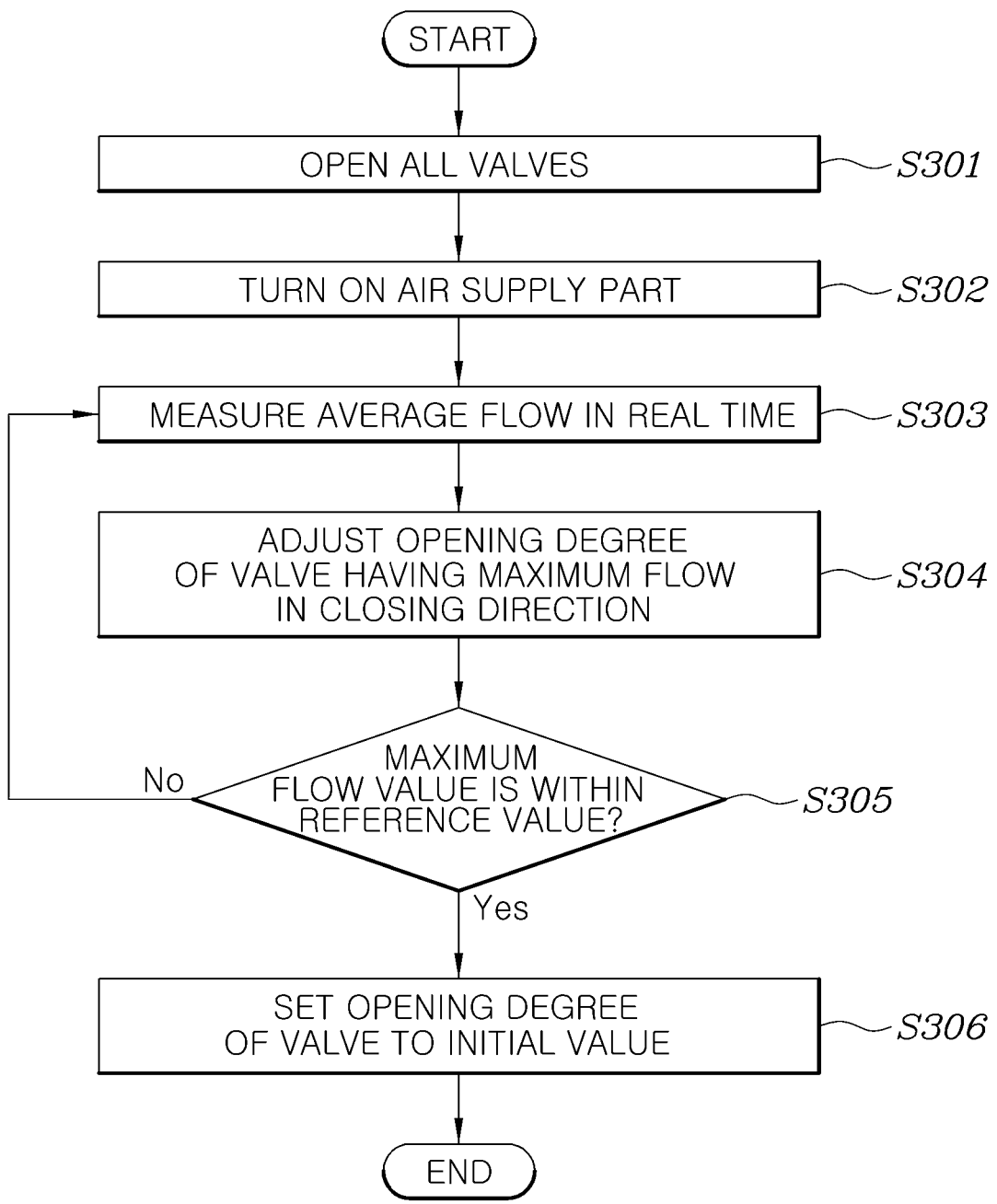
FIG. 3 is a flowchart illustrating an example of performing the initial setting of a valve, in the method of controlling the air flow according to an embodiment of the present disclosure.

First, FIG. 2 is a flowchart illustrating a method for controlling an air flow using the incorporated air supplying apparatus of the fuel cell stack according to an embodiment of the present disclosure, and FIG. 3 is a flowchart illustrating an example of performing the initial setting control (correction function) of the valve.

Referring to FIG. 2, during the operation of the fuel cell at S202, it is checked whether the air flow control is required at S203. When the air flow control is required, the controller may control the air flow at S204. In this connection, an initial setting control step S201 for the opening degree of the valve may be selectively performed. Through the initial setting control step S201, the flow deviation may be previously reduced before the operation of the fuel cell, so air may be uniformly supplied to each fuel cell stack as described above.

Meanwhile, specific steps related to the initial setting control for the opening degree of the valve are shown in FIG. 3.

During the initial setting control of the opening degree of the valve related to the correction function, all the valves are fully opened by the controller at S301, and the air supply part is controlled to operate at a preset rpm for correction at S302. The rpm for correction is a preset value for the initial setting control, and is designated to uniformly set an initial value in a state where the air supply part is operated at a specific rpm.

Subsequently, the flowmeter measures the air flow supplied to each fuel cell stack in real time at S303, and detects a valve where the maximum flow passes according to the measured result.

The valve on the flowmeter, which is determined as having the maximum flow, should be controlled to reduce the flow. In this case, the control is performed to approach the average flow by reducing the associated flow. Therefore, the controller adjusts the opening degree of the valve having the maximum flow in the closing direction at S304, and the controller checks whether flow values detected in real time by each flowmeter are within a reference value in relation to the measured average flow at S305. Here, the average flow may be the average value of flow values measured at step S303. For the purpose of more accurate measurement, after the step of controlling the opening degree of the valve at step S304, the average value of the measured flow values may be used. Further, whether the flow value is within the reference value at step S305 may be determined depending on whether the maximum flow deviation determined from a difference between the maximum flow value among the measured flow values and the average flow value is within a preset reference flow.

If it is determined that the flow deviation in each pipe is not within a preset reference value (i.e., when the maximum flow deviation is within a reference flow), the process returns to step S303 and performs the following steps again. Such a process may be repeated until the maximum flow deviation falls within the preset reference value.

In contrast, if the flow deviation in each pipe is within the preset reference value, the initial setting may be completed. Thus, current information on the opening degree of each valve may be extracted, and the controller may store the extracted information on the opening degree of the valve as the initial setting at S306.

Figure 4:
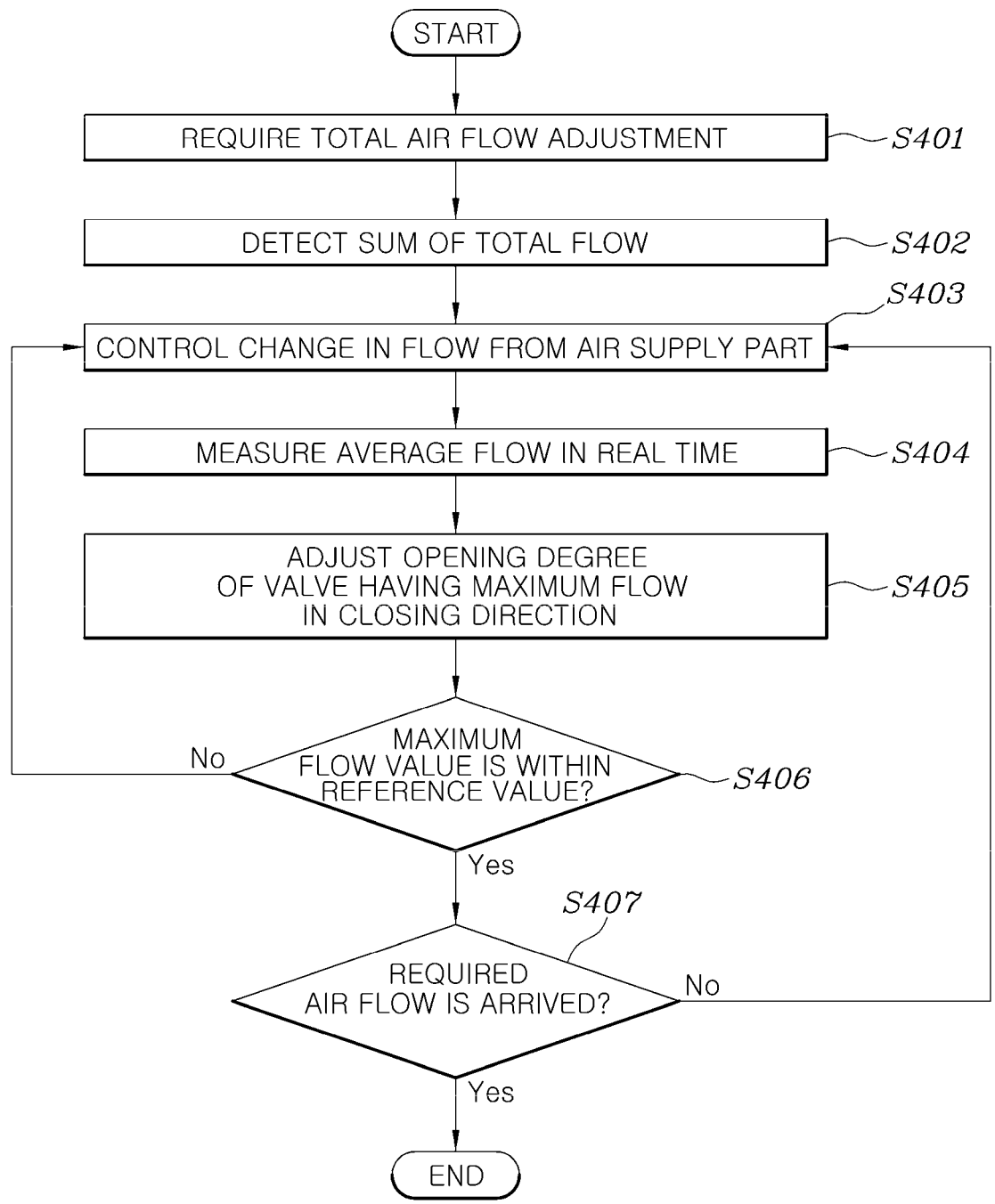
FIG. 4 is a flowchart illustrating an example of controlling a total air flow, in the method of controlling the air flow according to an embodiment of the present disclosure.

FIG. 4 is a flowchart illustrating an example of controlling a total air flow, in the method of controlling the air flow according to an embodiment of the present disclosure.

In the method of controlling the air flow using the incorporated air supplying apparatus for the fuel cell stack according to an embodiment of the present disclosure, when it is required to adjust a total air flow, that is, during the operation of the fuel cell stack, the air flow for all the fuel cell stacks may be evenly adjusted if necessary. For example, a case where it is required to adjust the total air flow may be a case where it is required to equalize the air flow for all the fuel cell stacks (it is required to evenly increase or decrease the air flow for all the stacks), or a case where a flow value at a specific rpm of the air supply part is different from a required flow level due to a change in system operating environment.

As shown in FIG. 4, when it is required to adjust the total air flow at S401, a step S402 of measuring the sum of the total air flow supplied to the fuel cell stack may be performed. The sum of the detected total flow may be utilized to verify whether a desired flow has been reached after a series of subsequent control processes. In some cases, for example, when a final required flow is specified, this step S402 may be omitted.

In order to control the total air flow, the rpm of the air supply part may be increased or decreased to control a change in flow to a desired level at S403. In this regard, when the flow supplied from the air supply part is controlled to be changed, it may be immediately controlled to be changed in proportion to a required change amount in flow. However, for the purpose of more accurate control, the rpm of the air supply part may be controlled so that only a small change in flow corresponding to a preset change in unit flow, i.e., 'q' occurs. After such a small change in flow, a series of control processes for minimizing the flow deviation between the stacks is repeated, so a precision control may be performed. Such a precision control may prevent the amount of air supplied to the fuel cell stack from being temporarily greatly changed. This may be more stable.

After the supply flow control step S403 for adjusting the flow supplied from the air supply part, an average flow calculation step S404 of measuring the air flow supplied through each pipe by each flowmeter and then calculating information on the average flow is performed.

On the other hand, the controller may perform a valve opening-degree control step S405 of controlling such that the flow (maximum flow) on the associated pipe approaches the average flow, by checking the fuel cell stack through which the maximum flow passes on the basis of flow information obtained from each flowmeter, and adjusting the opening degree of the valve on the pipe through which the maximum flow passes in the closing direction. Such a valve opening-degree control step may be the process of performing fine adjustment until the opening degree of the valve through which the maximum flow passes sufficiently approaches the average flow. Here, whether the opening degree of the valve having the maximum flow sufficiently approaches the average flow may be determined through a flow-deviation check step S406 of checking whether a maximum flow deviation determined from a difference between the flow value of the pipe having the maximum flow reduced by the control of the valve opening degree and the average flow is within a preset reference value.

When it is determined through the flow-deviation check step that the opening degree of the valve having the maximum flow sufficiently approaches the average flow, a required flow arrival check step S407 is performed to determine whether or not to arrive at a flow value required for each fuel cell stack, on the basis of the flow information measured by each flowmeter.

On the other hand, when it is determined through the flow-deviation check step S406 that the maximum flow deviation is out of a preset reference value, the average flow calculation step S404, the valve opening-degree control step S405, and the flow-deviation check step S406 are repeatedly performed until the maximum flow deviation falls within the preset reference value.

Further, when it is determined through the required flow arrival check step S407 that the flow does not arrive at the flow value required for each fuel cell stack, the process returns to the step S403 to adjust the air supply flow from the air supply part again depending on the required flow value, and the average flow calculation step S404 and the following steps may be performed again.

Figure 5:
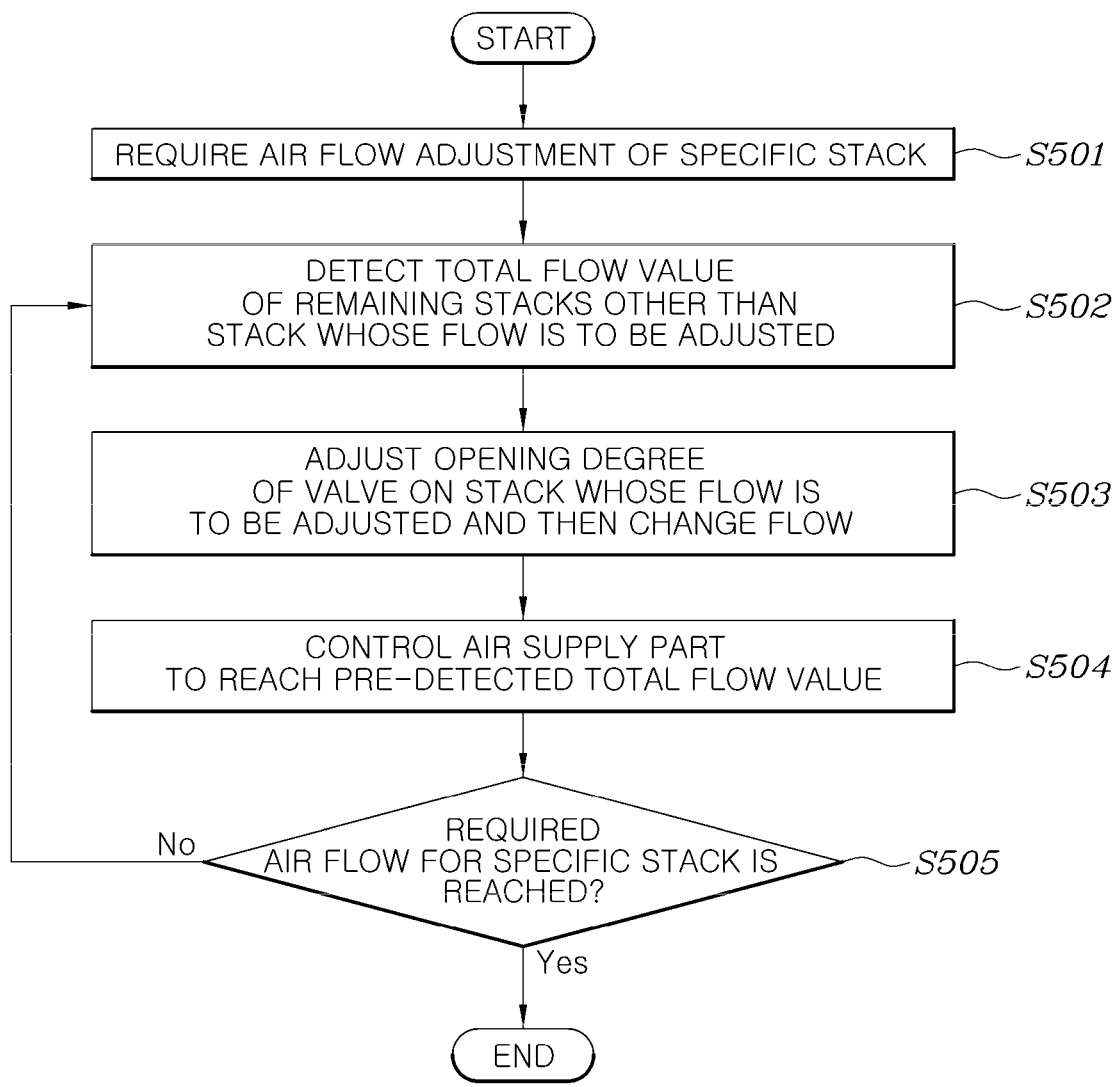
FIG. 5 is a flowchart illustrating an example of controlling the air flow of a specific individual stack, in the method of controlling the air flow according to an embodiment of the present disclosure.

On the other hand, when controlling the air flow, there may occur a case where the air flow control for the individual stack is required due to the problem of a specific individual stack. FIG. 5 is a flowchart illustrating an embodiment of controlling the air flow, when the air flow control of a specific individual stack is required.

As shown in FIG. 5, when the air flow adjustment for a specific fuel cell stack is required at S501, during the operation of the fuel cell stack, a total flow detection step S502 of measuring and storing a total flow of air supplied to the remaining fuel cell stacks other than the fuel cell stack whose flow is to be adjusted is performed.

Subsequently, a valve opening-degree control step S503 may be performed to adjust the opening degree of the valve for the fuel cell stack whose flow is to be adjusted, depending on the required air flow. In the case of the valve opening-degree control step, the required air flow control may be performed once as described above. Preferably, the opening degree of the valve is slowly adjusted in an opening direction to cause a small change in flow corresponding to the unit flow change, 'q' with a sufficient time.

As in the previous example of FIG. 4, in order to perform a precise control, it is preferable to set the unit flow change, 'q' as small as possible and to repeatedly perform the flow control.

When a change in flow of the stack that is to be adjusted occurs through the valve opening-degree control step S503, a change in total flow supplied to the remaining stacks occurs as the air flow to the corresponding stack increases or decreases. Therefore, in order to compensate for the change in total flow, a control is required to increase or decrease the supply flow of the air supply part. For example, when a flow for a first stack is increased by the unit flow change 'q', the total flow of the remaining stacks is decreased in proportion to the increase in flow of the first stack. To compensate for this, it is necessary to slowly increase the rpm of the air supply part so that the total flow of the remaining stacks increases to the same level as that before the flow for the first stack is controlled. In contrast, when it is required to control to reduce the flow for the first stack, the control for reducing the flow may be made by setting the unit flow change 'q' to a negative (−) value and controlling to decrease the rpm of the air supply part.

To this end, as shown in FIG. 5, a total flow of air supplied to remaining fuel cell stacks may be measured in real time, and then a supply flow control step S504 of adjusting a supply flow supplied from the air supply part may be performed until the total flow for the remaining stacks measured in real time reaches the total flow for the remaining stacks, which is previously stored.

When the flow value for the remaining stacks is restored to the same level as a previous value, the control operation of the air supply part is completed, and a step S505 may be performed to check whether the air flow of a specific stack that is to be adjusted has reached an initially required air flow value.

When it is determined that the air flow has reached the required air flow, the control operation is completed. On the other hand, when the air flow does not reach the required air flow, the step 502 and the following steps may be repeatedly performed until the air flow reaches the required air flow value.

Figure 6:
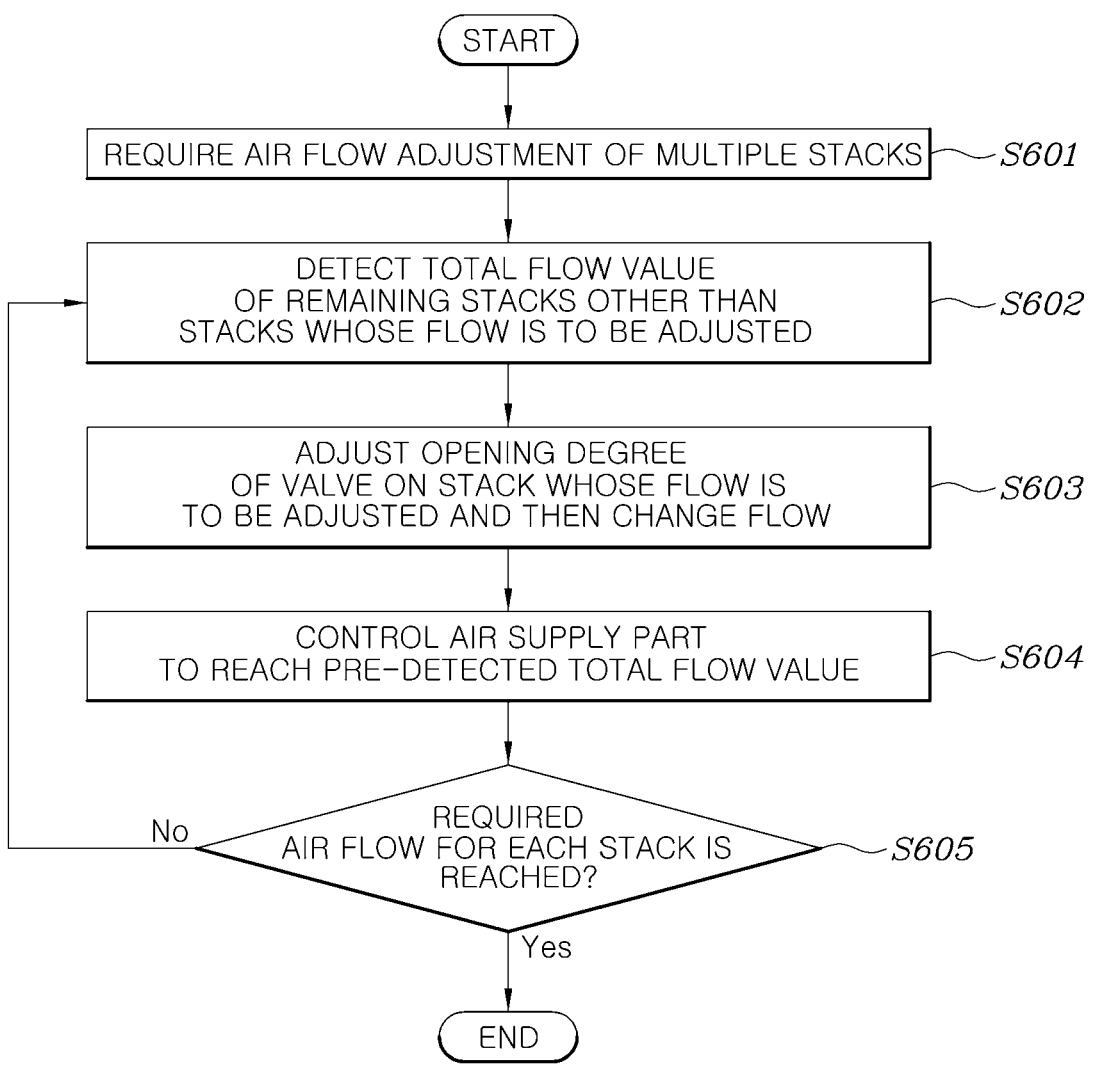
FIG. 6 is a flowchart illustrating an example of simultaneously controlling the air flow of several stacks, in the method of controlling the air flow according to an embodiment of the present disclosure.

FIG. 6 illustrates the method of controlling the air flow according to an embodiment of the present disclosure, and illustrates an example of simultaneously controlling the air flow of several stacks, unlike the example of FIG. 5.

As shown in FIG. 6, when it is required to adjust the air flow of a plurality of fuel cell stacks, e.g., two or more fuel cell stacks at S601, during the operation of the fuel cell stacks, a total flow detection step S602 may be performed to measure and store a total flow of air supplied to the remaining fuel cell stacks other than the two or more fuel cell stacks whose flow is to be adjusted.

Subsequently, a valve opening-degree control step S603 may be performed to adjust the opening degree of each of the valves for the two or more fuel cell stacks whose flow is to be adjusted, depending on the required air flow, thus changing a flow.

In the valve opening-degree control step S603, the change in flow may be slowly adjusted in stages by the unit flow change 'q', as in the example of FIG. 5.

After the valve opening-degree control step S603 for changing the flow is performed, in order to compensate for the change in the total flow for the remaining stacks, the total flow for the air supplied to the remaining fuel cell stacks is measured in real time, and a supply flow control step S604 may be performed to adjust the supply flow supplied from the air supply part until the total flow for the remaining stacks measured in real time reaches the total flow for the remaining stacks, which is previously stored.

For example, when the flow of each of the first to third stacks is increased by the unit flow change 'q', the total flow of the remaining stacks is reduced in proportion to the increase in flow of each of the first to third stacks. In order to compensate for this, the control operation is performed to slowly increase the rpm of the air supply part and thereby increase the total flow of the remaining stacks. In contrast, when it is required to control to reduce the flow for the first to third stacks, the control for reducing the total flow for the remaining stacks may be made by setting the unit flow change 'q' to a negative (−) value and controlling to decrease the rpm of the air supply part.

According to another embodiment of the present disclosure, before the total flow detection step S602, a step of determining whether the sum of flow changes for the fuel cell stacks whose air flow is to be adjusted exceeds a preset reference flow may be further included. In this example, when the sum of flow changes for the fuel cell stacks whose air flow is to be adjusted, i.e., a total flow change Q exceeds a reference flow, the air flow control may be separately performed for each group. Therefore, in this embodiment, the total flow detection step S602, the valve opening-degree control step S603, and the supply flow control step S604 may be performed for each group.

For example, assuming that the unit flow change is defined as 'q' and time for adjusting the valve is defined as T, the total flow change Q during time T is equal to the sum of the unit flow changes 'q' of the respective stacks. At this time, if a flow reduction control or a flow increase control is required for all of the plurality of stacks, the total flow change Q may be excessively increased. This may excessively increase a change in flow of the fuel cell stack whose flow is not to be adjusted, so this is not suitable for stable operating environment of the fuel cell stack.

Therefore, according to a preferred embodiment of the present disclosure, in order to prevent the total flow change Q from being excessively increased, it may be determined whether the flow change Q of all the stacks whose flow is to be adjusted in a control time T exceeds a preset reference flow. When it is determined that the sum of the flow changes required in the control time, i.e., the total flow change Q exceeds the reference flow, the fuel cell stacks whose air flow is to be adjusted may be separated into a plurality of groups and be controlled in flow such that the total flow change Q is within the reference flow. Therefore, control schedules of the fuel cell stacks are divided for respective groups, and the flow controls for the groups assigned to the respective control schedules are sequentially performed. In this regard, the reference flow may be appropriately selected in consideration of the operational stability of the fuel cell stacks, and may be a value that varies depending on the number of remaining stacks that do not require flow changes.

Specific examples thereof will be described with reference to FIGS. 7A to 7C.

Figure 7A:
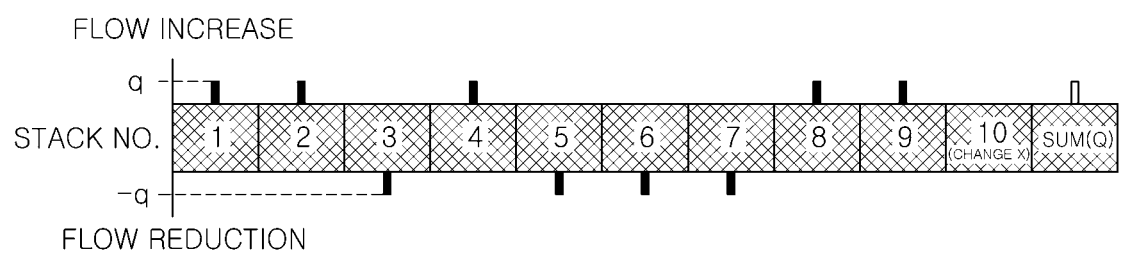
Figure 7B:
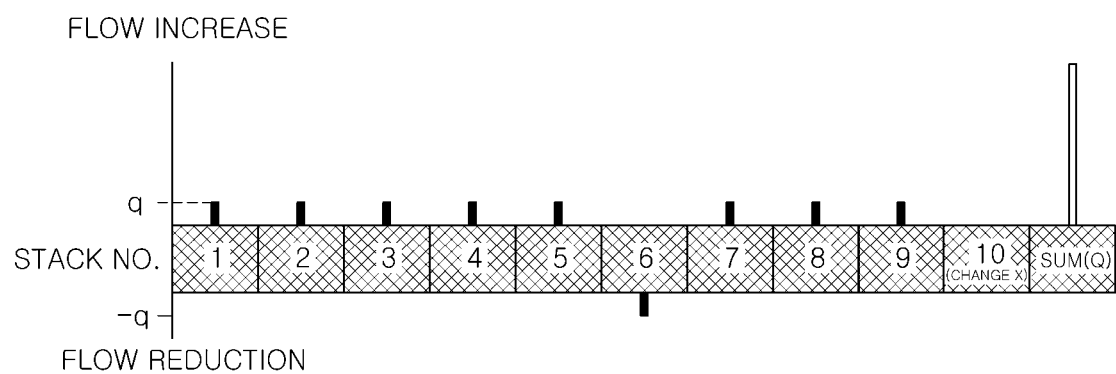
Figure 7C:
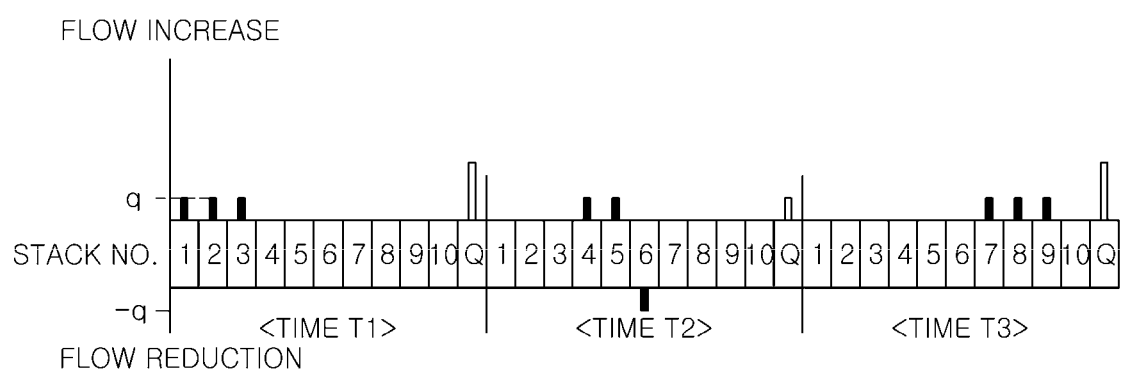

FIGS. 7A to 7C illustrate examples where air flows are simultaneously controlled in ten fuel cell stacks.

First, FIG. 7A illustrates an example where the air flows of several stacks are simultaneously adjusted based on the absolute value of a total flow change. Referring to FIG. 7A, first, second, fourth, eighth, and ninth stacks require a flow increase control by the unit flow change 'q', and third, fifth, sixth, and seventh stacks require a flow reduction control by the unit flow change 'q'. Meanwhile, a tenth stack is a stack that does not need to be changed.

In FIG. 7A, since the total flow change Q is only 'q' and thus the absolute value of the total flow change Q is not excessively large, this may rarely affect the tenth stack that does not need to change the flow. Therefore, the air flows of nine stacks may be simultaneously controlled.

In contrast, FIG. 7B illustrates an example where it is impossible to simultaneously adjust the air flows of several stacks based on the absolute value of a total flow change. In other words, in the example of FIG. 7B, the tenth stack is a stack that does not need to be changed, and only the sixth stack, among the stacks where flow adjustment is needed, requires the flow reduction control as much as the unit flow change 'q'. Meanwhile, in the case of the first to fifth and seventh to ninth stacks, the flow increase control is required as much as the unit flow change 'q'.

Therefore, in the example of FIG. 7B, the total flow change Q becomes '7q'. In this case, since the absolute value of the total flow change Q is excessively increased, this greatly affects the tenth stack in which the flow control is not performed. A preferred embodiment of the present disclosure allows the flow control to be separately performed for each stack, thus solving the above-described problem.

In this regard, FIG. 7C shows an example where air flow is separately adjusted for each section, when the flow control of FIG. 7B is required.

In the example of FIG. 7C, the air flow control is performed for the first to third stacks during time T1, the air flow control is performed for the fourth to sixth stacks during time T2, and the air flow control is performed for the seventh to ninth stacks during time T3.

For example, since the total flow change Q is reduced to '3q' during the control time T1, and the stack in which the air flow is not changed is increased from one stack that is the tenth stack to seven stacks that are fourth to tenth stacks, it is possible to greatly reduce a change in flow for each fuel cell stack.

Although the present disclosure was described with reference to specific embodiments shown in the drawings, it is apparent to those skilled in the art that the present disclosure may be changed and modified in various ways without departing from the scope of the present disclosure, which is described in the following claims.

The invention claimed is:

1. An incorporated air supplying apparatus for a fuel cell stack, the incorporated air supplying apparatus comprising:
   an air supply part configured to supply air to a plurality of fuel cell stacks;
   a plurality of pipes configured to transmit the air supplied from the air supply part to each of the fuel cell stacks;
   a valve installed at each of the plurality of pipes, the valve configured to control a flow of air flowing through each of the pipes;
   a plurality of flowmeters configured to measure the flow of the air flowing through each of the pipes; and
   a controller controlling an opening degree of each of the valves, based on information on the flow measured by each of the flowmeters;
   wherein the controller controls the opening degree of each of the valves installed at each of the pipes, thereby enabling the air flow for each of the pipes to be controlled;
   wherein the controller is configured to enable an initial setting control process for the opening degree of each of the valves;
   wherein, in a state where all the valves are opened and the air supply part is operated at a preset correction rpm, during the initial setting control process, the opening degree of each of the valves is controlled by the controller, and then information on the opening degree of the valve is extracted when a flow deviation of each of the pipes is within a preset reference value; and
   wherein the controller stores the extracted information on the opening degree of the valve as an initial setting.

2. The incorporated air supplying apparatus of claim 1, wherein the controller repeats one or more times a process of adjusting the opening degree of the valve on the pipe through which a maximum flow passes, in the closing direction, based on flow information measured by each of the flowmeters during the initial setting control, thereby controlling the opening degree of the valve on the pipe having the maximum flow, such that the flow of the pipe having the maximum flow approaches average flow information that is an average value of values measured by the flowmeters, and then reducing the flow deviation.

3. The incorporated air supplying apparatus of claim 1, wherein the controller is configured to adjust a supply flow supplied from the air supply part,
   wherein, when uniform air flow control is required for all the fuel cell stacks:
   an air flow supplied from each of the pipes is measured by each of the flowmeters, in a state where the flow supplied from the air supply part is adjusted;
   the controller adjusts the opening degree of the valve on the pipe through which the maximum flow passes, in the closing direction, based on flow information measured by each of the flowmeters, thereby controlling to reduce the flow deviation between the flow of the pipe having the maximum flow and average flow information that is an average value of values measured by the flowmeters; and
   the controller repeats average flow measurement and flow deviation reduction control until the flow deviation of each of the pipes is within a preset reference value.

4. The incorporated air supplying apparatus of claim 3, wherein the controller determines whether or not to reach a flow value required by each of the fuel cell stacks, based on the flow information measured by each of the flowmeters, and wherein, when the flow value required by each of the fuel cell stacks is not reached even if the flow deviation of each of the pipes is within the preset reference value, supply air flow control, average flow measurement, and flow deviation reduction control of the air supply part are repeatedly performed until reaching the required flow value.

5. The incorporated air supplying apparatus of claim 1, wherein the controller is configured to adjust a supply flow supplied from the air supply part, wherein, when air flow control is required for a specific fuel cell stack:
   a total flow of air supplied to remaining fuel cell stacks other than the specific fuel cell stack is measured and stored; and
   the controller performs the air flow control for the specific fuel cell stack while repeating one or more times a process of measuring a total flow of air supplied to the remaining fuel cell stacks in real time, in a state where the opening degree of the valve of the specific fuel cell stack is controlled to be changed depending on a required air flow, and then adjusting the supply flow supplied from the air supply part until the total flow of the remaining stacks measured in real time reaches a total flow of the remaining stacks, which is previously stored.

6. The incorporated air supplying apparatus of claim 1, wherein the controller is configured to adjust a supply flow supplied from the air supply part, wherein, when air flow control is required for two or more specific fuel cell stacks:
   a total flow of air supplied to remaining fuel cell stacks other than the two or more specific fuel cell stacks is measured and stored; and
   the controller performs the air flow control for the specific fuel cell stacks while repeating one or more times a process of measuring a total flow of air supplied to the remaining fuel cell stacks in real time, in a state where the opening degree of the valve of one of the specific fuel cell stacks is controlled to be changed depending on a required air flow, and then adjusting the supply flow supplied from the air supply part until the total flow of the remaining stacks measured in real time reaches a total flow of the remaining stacks, which is previously stored.

7. The incorporated air supplying apparatus of claim 6, wherein, when the sum of flow changes for the specific fuel cell stacks exceeds the preset reference flow, the controller separately controls the air flow such that the sum of the flow changes for the fuel cell stacks is within the preset reference flow.

8. A method for controlling an air flow using an incorporated air supplying apparatus for a fuel cell stack, the incorporated air supplying apparatus comprising:
- an air supply part configured to supply air to a plurality of fuel cell stacks;
- a plurality of pipes configured to transmit the air supplied from the air supply part to each of the fuel cell stacks;
- a valve installed at each of the plurality of pipes, the valve configured to control a flow of air flowing through each of the pipes;
- a plurality of flowmeters configured to measure the flow of the air flowing through each of the pipes; and
- a controller controlling an opening degree of each of the valves, based on information on the flow measured by each of the flowmeters;
- wherein the controller controls the opening degree of each of the valves installed at each of the pipes, thereby enabling the air flow for each of the pipes to be controlled;
- wherein the method comprises:
- an initial setting control process for controlling an opening degree of each of valves by a controller, before an operation of the fuel cell stack,
- wherein, in the initial setting control process, the controller controls the opening degree of each of the valves to extract information on the opening degree of the valve when a flow deviation of each of pipes is within a preset reference value, in a state where all the valves are opened and the air supply part is operated at a preset correction rpm, and
- the controller stores the extracted information on the opening degree of the valve as an initial setting.

9. The method of claim 8, wherein the initial setting control process comprises:
- an initiation step at which all the valves are opened and the air supply part is operated at the preset correction rpm;
- an average flow calculation step of calculating average flow information, based on flow information measured by each of flowmeters;
- a valve opening-degree control step of adjusting an opening degree of the valve on the pipe through which a maximum flow passes, in a closing direction;
- a flow-deviation check step of checking whether a maximum flow deviation determined from a difference between a flow value of the maximum flow pipe reduced at the valve opening-degree control step and the average flow information is within a preset reference value; and
- a step of extracting opening-degree information of each of the valves to store the information as the initial setting, when the maximum flow deviation is within the preset reference value.

10. The method of claim 9, wherein, at the flow-deviation check step, when the maximum flow deviation is out of the preset reference value, the average flow calculation step, the valve opening-degree control step, and the flow-deviation check step are repeatedly performed until the maximum flow deviation falls within the preset reference value.

11. A method for controlling an air flow using an incorporated air supplying apparatus for a fuel cell stack, the incorporated air supplying apparatus comprising:
- an air supply part configured to supply air to a plurality of fuel cell stacks;
- a plurality of pipes configured to transmit the air supplied from the air supply part to each of the fuel cell stacks;
- a valve installed at each of the plurality of pipes, the valve configured to control a flow of air flowing through each of the pipes;
- a plurality of flowmeters configured to measure the flow of the air flowing through each of the pipes; and
- a controller controlling an opening degree of each of the valves, based on information on the flow measured by each of the flowmeters;
- wherein the controller controls the opening degree of each of the valves installed at each of the pipes, thereby enabling the air flow for each of the pipes to be controlled;
- wherein the method comprises:
- when uniform air flow control is required for all the fuel cell stacks, during an operation of each of the fuel cell stacks:
- a supply flow control step of controlling a flow supplied from the air supply part;
- an average flow calculation step of calculating average flow information by measuring an air flow supplied through each of pipes by each of flowmeters;
- a valve opening-degree control step of controlling an opening degree of the valve on the pipe through which a maximum flow passes, in a closing direction;
- a flow-deviation check step of checking whether a maximum flow deviation determined from a difference between a flow value of the maximum flow pipe reduced at the valve opening-degree control step and the average flow information is within a preset reference value; and
- a required flow arrival check step of checking whether or not to arrive at a flow value required for each fuel cell stack, on the basis of the flow information measured by each of the flowmeters.

12. The method of claim 11, wherein, when it is determined through the flow-deviation check step that the maximum flow deviation is out of the preset reference value, the average flow calculation step, the valve opening-degree control step, and the flow-deviation check step are repeatedly performed until the maximum flow deviation falls within the preset reference value; and wherein, when it is determined through the required flow arrival check step that the flow does not arrive at the flow value required for each fuel cell stack, the air supply flow from the air supply part is adjusted depending on the required flow value, and then the average flow calculation step and the following steps are performed again.

* * * * *